(12) United States Patent
Guzman et al.

(10) Patent No.: US 10,412,020 B2
(45) Date of Patent: Sep. 10, 2019

(54) BACKGROUND PROCESSES IN UPDATE LOAD BALANCERS OF AN AUTO SCALING GROUP

(71) Applicant: Amazon Technologies, Inc., Seattle, WA (US)

(72) Inventors: Marcel Robert Guzman, Burnaby (CA); Norman Jordan, Vancouver (CA); Shawn Jones, Vancouver (CA); Ahmed Usman Khalid, Port Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 14/701,518

(22) Filed: Apr. 30, 2015

(65) Prior Publication Data

US 2016/0323197 A1     Nov. 3, 2016

(51) Int. Cl.
| | |
|---|---|
| *G06F 15/16* | (2006.01) |
| *H04L 12/911* | (2013.01) |
| *G06F 9/46* | (2006.01) |
| *H04L 12/24* | (2006.01) |

(52) U.S. Cl.
CPC .............. *H04L 47/726* (2013.01); *G06F 9/46* (2013.01); *H04L 41/0893* (2013.01)

(58) Field of Classification Search
CPC ..... H04L 67/10; H04L 67/02; H04L 67/1029; H04L 41/5054; H04L 67/1031; H04L 41/22; H04L 47/125; H04L 67/101; H04L 67/1008; H04L 67/1002; G06F 2009/45595; G06F 9/5005
See application file for complete search history.

(56) References Cited

U.S. PATENT DOCUMENTS

| | | | |
|---|---|---|---|
| 4,403,286 | A | 9/1983 | Fry et al. |
| 4,633,387 | A | 12/1986 | Hartung et al. |
| 5,787,247 | A | 7/1998 | Norin et al. |
| 6,725,253 | B1 | 4/2004 | Okano et al. |
| 7,310,674 | B2 | 12/2007 | Mitsumori |
| 7,430,164 | B2 | 9/2008 | Bare |
| 7,574,508 | B1 | 8/2009 | Kommula |
| 7,881,208 | B1 | 2/2011 | Nosella et al. |
| 8,392,401 | B1 | 3/2013 | Aly et al. |

(Continued)

OTHER PUBLICATIONS

International Search Report and Written Opinion dated Jun. 23, 2016, International Patent Application No. PCT/US2016/030279, filed Apr. 29, 2016.

(Continued)

*Primary Examiner* — Djenane M Bayard
(74) *Attorney, Agent, or Firm* — Davis Wright Tremaine LLP

(57) ABSTRACT

A computing resource service provider may provide computing instances organized into logical groups, such as auto-scale groups. Computing instances assigned to an auto-scale group may be associated with one or more load balancers configured to direct traffic to the computing instances. Furthermore, customers of the computing resource service provider may add or remove load balancer from the auto-scale groups. A background process may be used to add and remove computer instances of the auto-scale group form the load balancers customers are attempting to have added or removed.

20 Claims, 10 Drawing Sheets

(56) References Cited

U.S. PATENT DOCUMENTS

| | | |
|---|---|---|
| 8,412,810 B1 | 4/2013 | Tompkins |
| 8,595,262 B1 | 11/2013 | Hayden |
| 8,756,298 B2 | 6/2014 | Ma et al. |
| 9,286,344 B1 | 3/2016 | Bhardwaj et al. |
| 9,705,800 B2 | 7/2017 | Sankar et al. |
| 2002/0040402 A1 | 4/2002 | Levy-Abegnoli et al. |
| 2002/0169876 A1 | 11/2002 | Curie et al. |
| 2003/0142685 A1 | 7/2003 | Bare |
| 2004/0133690 A1 | 7/2004 | Chauffour et al. |
| 2006/0148550 A1 | 7/2006 | Nee et al. |
| 2007/0179973 A1 | 8/2007 | Brodie et al. |
| 2010/0036903 A1* | 2/2010 | Ahmad ............... H04L 67/1002 709/202 |
| 2010/0036956 A1 | 2/2010 | Nishikawa |
| 2010/0107113 A1 | 4/2010 | Innes et al. |
| 2011/0078303 A1* | 3/2011 | Li ........................... G06F 9/505 709/224 |
| 2011/0126210 A1 | 5/2011 | Rivard et al. |
| 2011/0276695 A1 | 11/2011 | Maldaner |
| 2011/0276982 A1 | 11/2011 | Nakayama et al. |
| 2012/0066371 A1 | 3/2012 | Patel et al. |
| 2012/0254443 A1* | 10/2012 | Ueda ................... H04L 67/1008 709/226 |
| 2013/0031052 A1 | 1/2013 | Lubin |
| 2013/0132553 A1 | 5/2013 | Stratton et al. |
| 2013/0297802 A1 | 11/2013 | Laribi et al. |
| 2014/0067914 A1* | 3/2014 | Nishii ................. H04L 67/1008 709/203 |
| 2014/0068611 A1 | 3/2014 | McGrath et al. |
| 2014/0089500 A1 | 3/2014 | Sankar et al. |
| 2014/0101226 A1 | 4/2014 | Khandekar et al. |
| 2014/0165060 A1 | 6/2014 | Muller et al. |
| 2014/0169168 A1 | 6/2014 | Jalan et al. |
| 2014/0304414 A1* | 10/2014 | Yengalasetti ....... H04L 67/1036 709/226 |
| 2015/0089034 A1 | 3/2015 | Stickle et al. |
| 2016/0026514 A1 | 1/2016 | Cucinotta et al. |
| 2016/0050588 A1* | 2/2016 | Schoenen ............. H04W 28/08 455/453 |
| 2016/0091912 A1 | 3/2016 | Stanlake |
| 2016/0127456 A1* | 5/2016 | Rashad ............... H04L 67/1002 709/203 |
| 2016/0255013 A1 | 9/2016 | Cox et al. |
| 2016/0323187 A1 | 11/2016 | Guzman et al. |
| 2016/0323188 A1 | 11/2016 | Guzman et al. |
| 2016/0323197 A1 | 11/2016 | Guzman et al. |

OTHER PUBLICATIONS

Sato, "Implementing Blue-Green Deployments with AWS", published by Danilo Sato on Aug. 27, 2013, at https://www.thoughtworks.com/insights/blog/implementing-blue-green-deployments-aws, 13 pages.
Swindler, "EC2 Instance Belonging to Multiple ELBs," published by Shlomo Swidler on Jul. 23, 2009, at https://shlomoswidler.com/2009/07/ec2-instance-belonging-to-multiple-elbs.html, 6 pages.
Canadian Office Action, dated Aug. 22, 2018, for Patent Application No. 2,984,191, 3 pages.
U.S. Appl. No. 14/701,513, filed Apr. 30, 2015.
U.S. Appl. No. 14/701,522, filed Apr. 30, 2015.

* cited by examiner

BACKGROUND PROCESSES IN UPDATE LOAD BALANCERS OF AN AUTO SCALING GROUP

CROSS REFERENCE TO RELATED APPLICATIONS

This application incorporates by reference for all purposes the full disclosure of co-pending U.S. patent application Ser. No. 14/701,513, filed concurrently herewith, entitled "MANAGING LOAD BALANCERS ASSOCIATED WITH AUTO-SCALING GROUPS" and co-pending U.S. patent application Ser. No. 14/701,522, filed concurrently herewith, entitled "MANAGING STATE FOR UPDATES TO LOAD BALANCERS OF AN AUTO SCALING GROUP."

BACKGROUND

The use of hosted computing service and storage has proliferated in recent years. The resources for network computing and storage are often provided by computing resource providers who leverage large-scale networks of computers, servers and storage drives to enable clients, including content providers, customers and the like, to host and execute a variety of applications and web services. The usage of network computing allows content providers and customers, among others, to efficiently and adaptively satisfy their computing needs. However, with the growing use of virtual resources, customers are encountering situations in which the virtual resources cannot accommodate their needs during certain situations, such as unanticipated traffic spikes or need for immediate responses to satisfy increased loads. In response to this, web resource service providers are introducing automated scaling. In many cases, customers transmit requests to create instances such as, for example, virtual machine instances to execute on hardware devices. The instance can be automatically scaled enabling the service provider to accommodate customer needs during the situations described above. Once a customer has set up automated scaling activities it may be difficult for customers to modify instances and/or load balancers easily.

BRIEF DESCRIPTION OF THE DRAWINGS

Various embodiments in accordance with the present disclosure will be described with reference to the drawings, in which.

DETAILED DESCRIPTION

Figure 1:
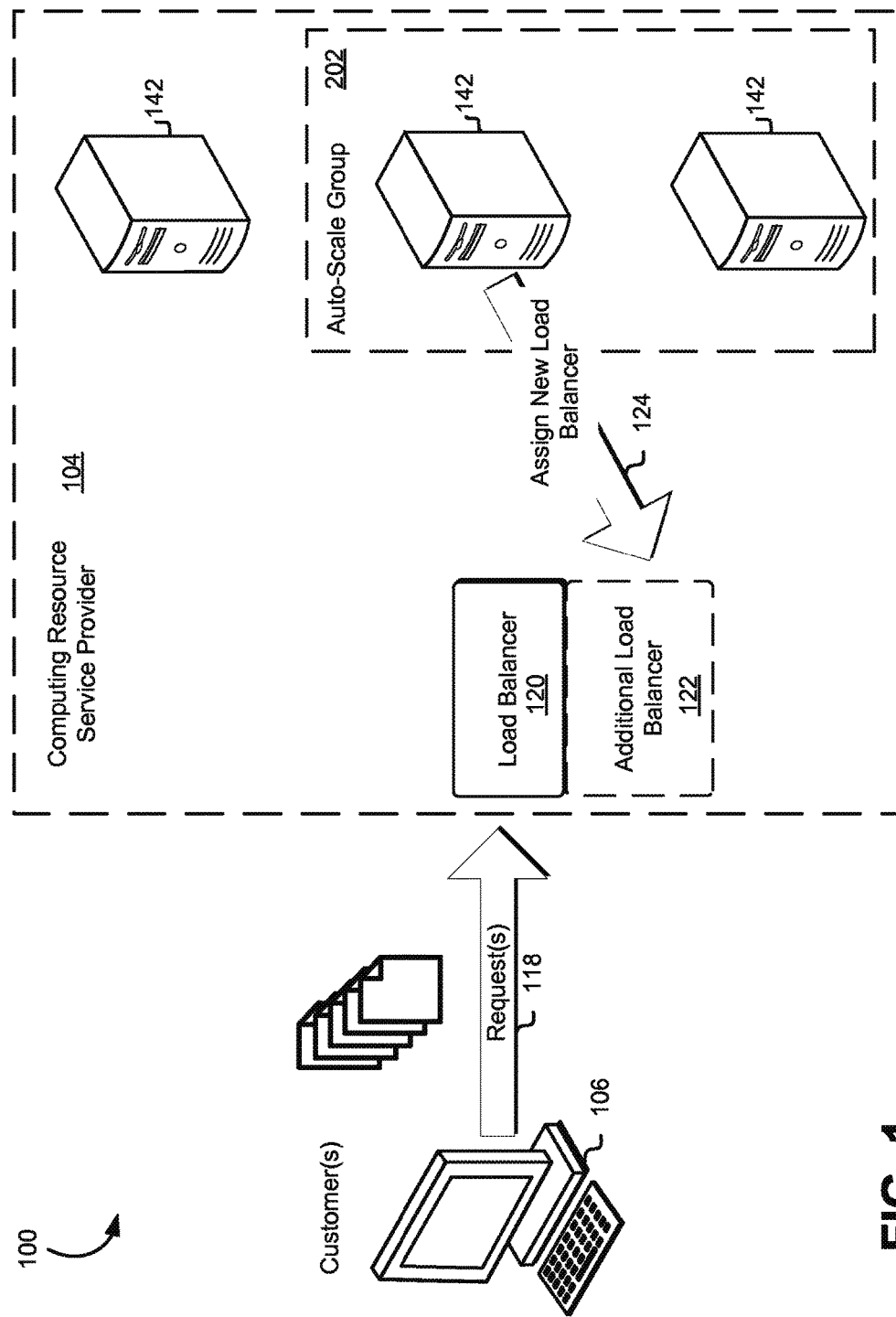
FIG. 1 illustrates an environment in which customers may provide requests to an auto-scaling service to interact with instances included in an auto-scaling group and load balancers associated with the auto-scaling group in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to customer management of virtual compute instances or simply instances assigned to an auto-scaling group and load balancers associated with the auto-scaling group. A customer of a computing resource service provider that hosts computer systems managed by the customers may, programmatically through one or more application programming interface calls, create an auto-scaling group to meet resource needs during certain situations, such as unanticipated traffic spikes or need for immediate responses to satisfy increased loads. The auto-scaling group may manage the resources for one or more computer instances (e.g., virtual computer system instances) created by the customer. The load balancers may be offered to customers of a computing resource service provider to facilitate request processing by the one or more instances of the customer's auto-scaling group. For example, the customer may operate a website using computing resources of the auto-scaling group, and the load balancers may be configured to direct traffic among the computing resources of the auto-scaling group, such as the one or more computer instances. Additionally, the website may receive requests from multiple other customers over a network. The computing resource service provider may then configure a load balancer to direct the requests to the auto-scaling group or particular instances of the auto-scaling group executing the website in such a way that the load generated by processing the request is distributed among the computer instances executing the website.

An auto-scaling service may automatically and dynamically manage the auto-scaling group to manage computing resources or any resources that might be subject to demand fluctuation. For example, the auto-scaling service may use various factors to determine whether to automatically and dynamically adjust and/or allocate resources in response to an event, such as load on the group exceeding a threshold.

Furthermore, the customer may also need to adjust and/or allocate resources in response to an event and/or manage an instance assigned to the auto-scaling group. The customer may interact with the auto-scaling service by transmitting requests to the computing resource service provider. The request may include a command, application programming interface (API) call, remote procedure call (RPC) or other instruction configured to cause a service of the computing resources service provider to perform various functions.

The computing resource service provider may expose API calls to the customer in order to enable the customer to modify load balancers associated with an auto-scale group while the auto-scale group is in operation. These API calls may eliminate a customer need to terminate and/or delete an auto-scale group or load balancer in order to modify the association between the load balancer and auto-scale group. For example, customer may submit an API request to the auto-scaling service to add a load balancer to the auto-scaling group. In various embodiments, adding a load balancer to the auto-scaling group causes the computing instances included in the auto-scaling group to be assigned to the load balancer such that the load balancer distributes network traffic to the computing instances assigned to the load balancer. The auto-scaling service may include a database configured to maintain status information and/or other information about the load balancers attached to the auto-scale group. The database may be configured to track state information for the load balancers associated with the auto-scale group to avoid maintaining a one-to-one mapping of load balancers to instances.

The state information may include a variety of different states, such as an adding state, an added state, an in-service state, and a removing state. The adding state may indicate that a background process is assigning all the instances in the group to the load balancers, upon completion the background process updates the status to be added. The added state may indicate that all the instances in the auto-scaling group have been assigned to a load balancer previously in the adding state. The in-service state may indicate that the load balancer is directing traffic to at least one healthy instance of the auto-scaling group as described in greater detail below. The removing state may indicate that the instance of the auto-scaling group is currently being deassigned to the particular load balancer. For any new instances added to the auto-scaling group, either as a result of customer interaction or configuration of the auto-scaling group, the background process may determine if a load balancer assigned to the auto-scaling group is in the adding, added, or in-service state. If the load balancer is in one of those states then the background process may register or assign the new instances to the load balancer.

FIG. 1 shows an illustrative example of an environment 100 in which load balancers may be assigned to a particular auto-scaling group 102 in order to process requests 118 directed at computer instances of the auto-scaling group operated by a customer 106. A computing resource service provider 104 may provide computing resources to customers 106. The customers 106 may utilize physical hosts 142, described in greater detail below, operated by the computing resource service provider 104 to perform a variety of functions. For example, the customers 106 may operate a website or log server using the computing resources of the computing resource service provider 104. Furthermore, customers 106 may create auto-scaling groups managed by the computing resource service provider 104. The auto-scaling groups 202, described in greater detail below, may comprise a set of computer instances operated by the customer 106.

The auto-scaling group may be configured to add or remove computer instances and other computing resources to/from the auto-scaling group based at least in part on setting provided by the customers 106 and/or computing resource service provider 104.

In some embodiments, the customers 106 may include organizations which operate computing resources which may be accessible to other customers of the computing resource service provider or other entities in general. For example, the customer may operate a website which is accessible to users over a network, such as the Internet. The term "organization," unless otherwise clear from context, is intended to be read in the broad sense to imply a set of principals organized in some manner. The customers 106 may use computing resources of the computing resource service provider 104 in order to operate a load balancer 120 and auto-scaling group 102 configured to distribute requests 118 to computing resources, such as computer instances, of the customers 106. As illustrated in FIG. 1, the computing resources of the customers 106 may include and/or be implemented by physical hosts 142 operated by the computing resource service provider 104. However, in various embodiments, the computing resources utilized by the customers 106 include computing resources of the customer or other entities in accordance with the present disclosure. For example, the customer may operate a load balancer 120 using computing resources of the computing resource servicer provider 104 to direct traffic to one or more servers operated by the customers 106.

The requests 118 may be received by the load balancer 120 or by one or more other systems of the computing resource service provider 104, such as a request listener not illustrated in FIG. 1 for simplicity, and directed to the load balancer 120. The load balancer 120 may be a computer system or virtual computer system configured to distribute the request 118 to one or more computer instances, supported by the physical hosts 142, in order to optimize resource utilization and/or avoid overloading a particular computer instance. For example, the load balancer 120 may include physical hardware connected to a server rack or otherwise included in a data center. In another example, the load balancer 120 may include one or more virtual machines supported by a particular physical host 142 operated by the computing resource service provider 104 as described in greater detail below.

In some embodiments, the number of requests 118 may be greater than the number of requests that the load balancer 120 may process given the amount of computing resources currently allocated to the load balancer 120. As a result, the customer 106 may determine to add an additional load balancer 122 to the auto-scaling group. The customer 106 may transmit a request, such as an API call, configured to cause the computing resource service provider 104 or component thereof (e.g., an auto-scale service described in greater detail below) to associate the additional load balancer 122 with the auto-scale group 102. As described herein, associating the load balancer 120 with the auto-scale group 102 includes assigning the computer instance included in the auto-scale group 202 to the load balancer 120 such that the load balancer directs requests and/or other network traffic to computer instances of the auto-scale group, described in greater detail below.

The customers 106 may be able to update (e.g., add or remove) the set of load balancers associated with the auto-scale group 102 regardless of whether the computing resource service provider 104 or component thereof is currently updating the set of load balancers associated with the auto-scale group 102. For example, a particular customer may accidentally transmit a request to add and/or remove the load balancer 120 from the auto-scale group 102 and then at some point in time later the customer may, while the computing resource service provider 104 is processing the accidental add and/or remove request, transmit a second request to reverse the accidental request. As a result of the second request, the computing resource service provider 104 may terminate processing the accidental request and begin processing the second request. Additionally, the computing resource service provider 104 may generate audit information corresponding to operations performed in adding and removing load balancers to auto-scale groups. The audit information may enable the customers 106 to determine the result of previous add or remove operations and the progress or state of existing load balancers.

As described above, the computing resource service provider 104 or component thereof, such as the auto-scale service described in greater detail below, may execute a background process configured to assign and de-assign computer instances of the auto-scale group 102 to the load balancer 120 and additional load balancer 122. Furthermore, the background process may be configured such that the customers 106 modify a capacity of the auto-scale group 102 (e.g., cause computer instances to be launched or terminated within the auto-scale group 102) regardless of the current state of the background process. For example, the background process may be assigning a set of computer instances of the auto-scale group 102 to the load balancer 120; the customer may then cause a new set of computer instances to be added to the auto-scale group 102 and, as a result, the background process may add the new set of computer instances to the set of computer instances to be assigned to the load balancer 120.

The background process may query a load balancer database, described in greater detail below in connection with FIG. 2, maintained by the auto-scale service in order to determine if any load balancers associated with the auto-scale group 102 are in a transient state (e.g., adding state, added state, and/or removing state). If there is at least one load balancer in a transient state, the background process may determine a set of computer instances and corresponding operations to perform based at least in part on the at least one load balancer's state. For example, if the load balancer is in the adding state, the background process may determine a batch of computer instances to assign to the load balancer. The background process may assign a computer instance to a load balancer by transmitting an API call to a load balancer service indicating the load balancer 120 and the computer instance to be assigned to the load balancer 120. In various embodiments, the background process may transmit a request directly to the load balancer 120 requesting that load balancer 120 manage traffic directed to the computer instance.

In some embodiments, adding the additional load balancer 122 may include instantiating one or more load balancers and assigning the instantiated load balancers to the auto-scale group 102. Furthermore, assigning the additional load balancer 122 may include updating one or more other computer systems. For example, the request listener described above may be updated with information corresponding to the additional load balancer 122 in order to route requests. In another example, a Domain Name System (DNS) entry or other naming system service entry may be updated to include an Internet Protocol (IP) address associated with the additional resources 122.

The customers 106 may modify the capacity of the auto-scale group 102 and/or load balancer 120 assigned to the group by submitting API calls to an interface, not shown in FIG. 1 for simplicity, of the computing resource service provider 104. For example, the customers 106 may assign additional computer instances to the auto-scale group 102 through a management console or other application configured to enable the customer to manage computing resources provided by the computing resource service provider 104. The management console may be exposed to the customers 106 as a webpage wherein the executable code of the webpage is configured to generate API calls to the computing resource service provider 104. The customers 106 may provide information corresponding to the auto-scale group 102, the computer instance of the auto-scale group 102, and load balancers assigned to the auto-scale group 102 through the management console. For example, the customer may provide the computing resource service provider 104 with an API call, and the API call may indicate a first number of load balancers to add to the auto-scale group and a second number of load balancers to remove from the auto-scale group 102. The information may include IP addresses of the computer instances associated with the auto-scale group 102, identifiers of the auto-scale group, computing resources allocated to the computer instances and/or auto-scale group 102, computational capacity and network capacity of the computer instances and/or auto-scale group 102, routing information, identifiers of the load balancers, and any other information configured to enable the auto-scale service to add and/or remove load balancers from the auto-scale group.

Figure 2:
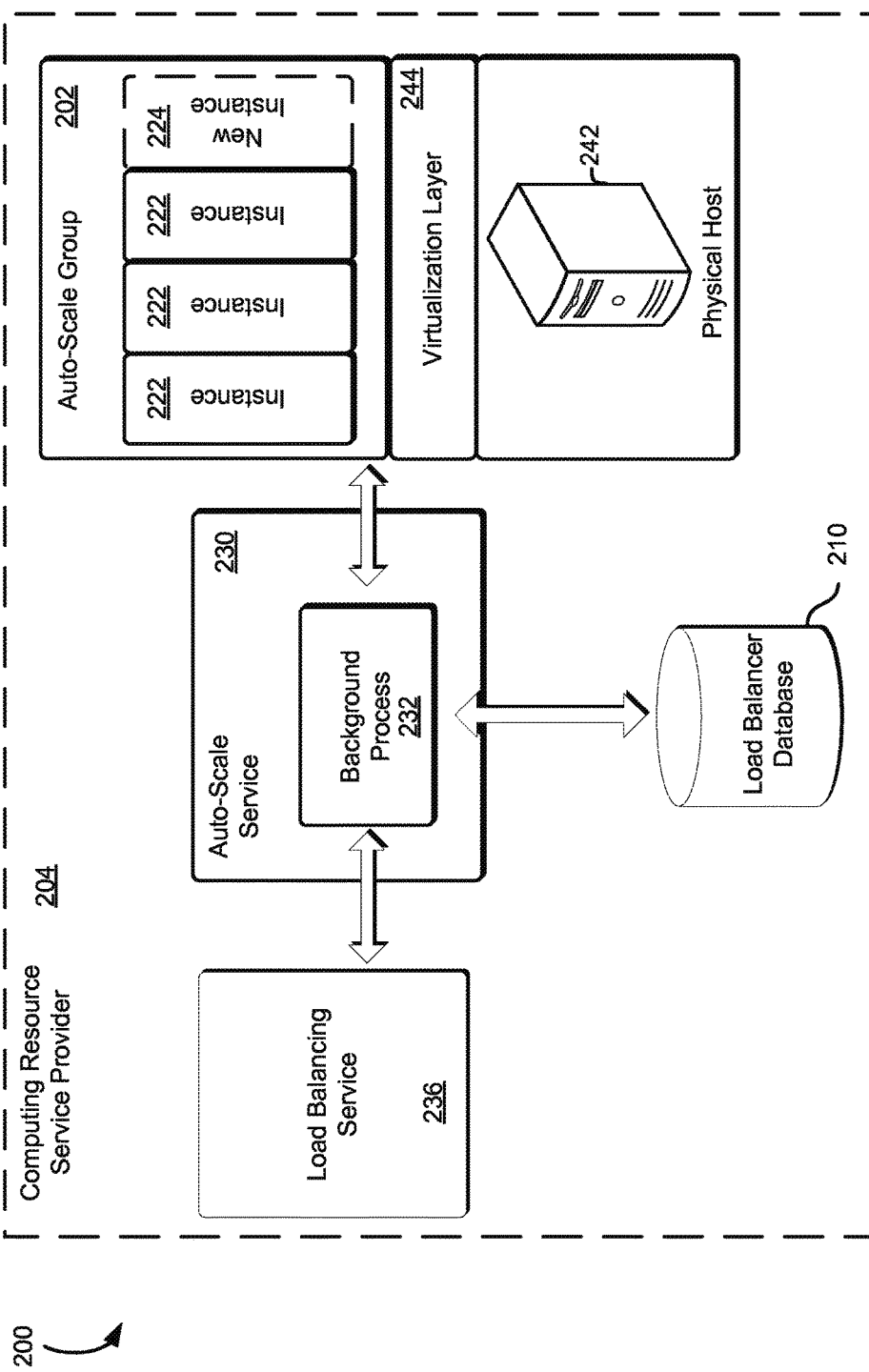
FIG. 2 illustrates an environment for instantiating instances and provisioning the instances to a set of implementation resources for an auto-scaling group and associating the instances to a load balancer in accordance with an embodiment.

FIG. 2 illustrates an environment for instantiating instances 222 and provisioning the instances 222 to a set of implementation resources for an auto-scale group 202 and associating the instances to a load balancer in accordance with an embodiment. As illustrated in FIG. 2, a computing resource service provider 204 operates a multitude of physical hosts 242. The physical hosts 242 may be any device or equipment configured to execute instructions for performing data computation, manipulation, or storage tasks, such as a computer or a server. The physical hosts 242 may include any computer system or virtual computer instance described above. A virtualization layer 244 operated by the computing resources service provider 204 enables the physical hosts 242 to be used to provide computational resources upon which one or more instances 222 may operate. Described in greater detail below, the virtualization layer 244 may be any device, software, or firmware used for providing a virtual computing platform for the instances 222. The virtual computing platform may include various virtual computer components, such as one or more virtual CPUs, virtual memories, virtual disks, and the like.

The auto-scale group 202 may contain one or instances 222 and may provision new instances 224 based at least in part on a variety of attributes. The variety of attributes may include a desired capacity as indicated by a customer, overall load on the auto-scale group 202, load on a particular instance of the auto-scale group 202, a request from a customer, a schedule, and any other attribute suitable for determining whether to add or remove instances from the auto-scale group 202. The instances 222 may be virtual computer systems configured to provide computing resources to the auto-scale group 202 and customers of the computing resource service provider 204 by at least performing various operations. In some embodiments, the auto-scale group 202 and instances operate as a single computing entity performing various operations for the customer.

A load balancing service 236, described in greater detail below in connection with FIG. 3, may provide load balancers and other traffic distribution services to the auto-scale group 202. For example, a DNS entry of a load balancer may include the IP address for various load instances 222 of the auto-scale group 202 and requests directed to the auto-scale group 202 may be distributed to the instance 222 assigned to the load balancer. During a scaling event requiring the allocation of computing resources to the auto-scale group 202, a computer instance image may be used to instantiate a new instance 224. When deallocating computing resources to the auto-scale group 202 operation of one or more of the instances 222 may be terminated or suspended. An auto-scale service, described in greater detail below in connection with FIG. 3, may determine whether instances 222 are to be added or removed from the auto-scale group 202.

The auto-scale service 230 may also include a background process 232, as described above, and the background process may assign or deassign instances 222 to one or more load balancers. The background process 232 may include logic or other computer executable code that, when executed by one or more processors of the physical host 242, causes the physical host 242 to perform various operations corresponding to adding and removing load balancers from the auto-scale group 202. In various embodiments, the auto-scale service 230 or load balancing service 236, when deassigning instances 222 from the one or more load balancers, will wait until all network connections to the instances 222 to be deassigned are terminated or completed. Once there are no more connection to the instances 222 to be deassigned, the load balancing service may remove the instances 222 from the set of instances to which the one or more load balancers direct traffic. This process may be referred to as connection draining, e.g., waiting until all current connections to particular instances have terminated while preventing new connections to the instance from being established.

Furthermore, when allocating or deallocating computing resources to the auto-scale group 202, a background process 232 of an auto-scale service 230 may transmit information corresponding to the allocation or deallocation of computing resources to the load balancing service 236 to enable the load balancing service to correctly direct traffic to the auto-scale group 202. For example, if the new instance 224 is added to the group, the background process may transmit an API call including an identifier of the new instance 224 configured to cause the load balancing service to assign the new instance 224 to one or more load balancers associated with the auto-scale group 202. Furthermore, the background process may update a load balancer database 210 with information corresponding to the instances 222, the new instance 224, and one or more load balancers assigned to the auto-scale group.

The load balancer database 210 may contain a set of rows and columns, where each row corresponds to a load balancer associated with the auto-scale group 202 and each column contains information corresponding to the auto-scale group 202, the instances 222, or other information suitable for adding or removing load balancers from an auto-scale group 202. The load balancer database 210 may include information suitable to tracking the state of a particular load balancer. Additionally, the information included in the load balancer database 210 may be used by the background process 232 to determine operations to perform in order to add or remove load balancers from the auto-scale group 202. For example, the background process 232 may query the database to determine one or more load balancers to associate with the new instance 224. Furthermore, as described herein, the load balancer database 210 may include any database or any other data store configured to store information corresponding to the one or more load balancers associated with the auto-scale group 202 including state information associated with the one or more load balancers.

The load balancer database 210 may be any data store and/or storage device described herein. Furthermore data regarding the operation of the auto-scale group 202, the instances 222, the background process 232, and the new instance 224 may be collected and/or monitored by the auto-scale service 230 and stored in the load balancer database 210 or other data store in order to generate audit log information and metrics information. Data regarding operation of the auto-scale group 202, the instances 222, the background process 232, and the new instance 224 includes any information regarding the actions performed by the auto-scale group 202, the instances 222, the background process 232, and the new instance 224, such as the metrics data (e.g., memory usage of the virtual host, file systems, information regarding virtual CPUs, or any other information regarding the auto-scale group 220 or component thereof) or actions preformed. The data may, in some embodiments, be converted into a format suitable for use with the audit log or audit service. In various embodiments, the data is stored persistently using an on-demand storage service of the computing resource service provider 204 in such a way that the customer may use the data to determine the operation of the background process 232 and the state load balancers associated to the auto-scale group 202.

In some embodiments, when a particular customer submits an API call configured to update (e.g., add or remove) one or more load balancers associated with the Auto-scale group 202, the auto-scale service 230 may perform several operations in order to process the API call. First the auto-scale service 230 may update a record in the load balancer database associated with the one or more load balancers indicated in the API call for the auto-scale group 202. This may ensure that any future instances, such as the new instance 224, launched in the auto-scale group 202 will be assigned to the one or more load balancers. The update to the load balancer database 210 may occur synchronously with receiving the request. The auto-scale service 203 may then queue an asynchronous process (e.g., the background process 232) that may determine a set of existing instances 222 and update the load balancers associated with the set of existing instances 222 to the one or more load balancers indicated by the customer in the API call. The background process 232 may be non-deterministic such that the same input (e.g., adding or removing the same set of load balancers) may not cause the background process 232 to operate in the same manner. For example, the order of operations may be different, the batch size of instances 222 to assign to the load balancer may be different, and any other operation of the background process described herein may be different.

The background process 232 may also create a record in a particular customer's scaling history (which can be retrieved using the DescribeScalingActivities API). The record and/or API may be used to track the process of updates to the one or more load balancers associated with the auto-scale group 202 and for audit purposes as needed by the customer. The record and any corresponding audit information may include a human-readable representation of the operations performed by the auto-scale service 230, for example, "updating load balancers for auto-scale group A in response to customer-110581's request to: add (loadbalancer1, loadbalancer2, loadbalancer3)." The record may also include a start time, an end time, and completion status once the auto-scale service has completed processing the request. As described above, the operations of the background process 232 will not lock or otherwise prevent updates to the auto-scale group 202, nor may the background process 232 prevent other updates to the one or more load balancers associated with the auto-scale group 202 from being processed concurrently. For example, if a particular customer updates the one or more load balancers associated with the auto-scale group 202 while another update is being processed, the auto-scale service 230 may terminate the previous update, restart the process, and generate another record in the customer's auto-scale history.

The environment such as that illustrated in FIG. 1 may be useful for a provider such as a computing resource provider, wherein the computing resource system responds to requests from customers to manage load balancers assigned to auto-scale groups. As discussed above, the computing resource system provides a mechanism to allow customers to add or remove load balancers from a set of instances associated with an auto-scale group. The environment in such a case may include additional components and/or other arrangements, such as those illustrated in the networked environment 300 of FIG. 3. In this example, the networked environment 300 includes a computing resource service provider 304 in data communication with a client device 306 and server computers 342 over a network 306. In one embodiment, the server computers 342 may be one or more computer hardware devices that are used to implement instances 320. For example, the server computers 342 may include hardware for implementing types of computing resources, such as storage devices, virtualized storage devices, networking devices, and the like as described above in connection with FIG. 2. Additionally, the implemented computing resources may be programmatically and remotely managed by a customer of the distributed computing resource provider.

The server computers 342 include a plurality of computer system devices that are each capable of executing one or more instances 320 created by the distributed computing resource service provider 304. In one embodiment, each of the server computers 342 includes a processor, a data store, an input/output bus, and/or any other component known in the art for executing instances 320. Additionally, the instances 320 may be virtual machine instances. As known in the art, a virtual machine instance is an instance of a software implementation on a machine (i.e., a computer) that executes programs like a physical machine. For example, each of the server computers 342 may be configured to execute an instance manager 318 capable of implementing the instances 320. For example, the instance manager 318 may be a hypervisor, virtualization layer, or another type of program configured to enable the execution of multiple instances 320 on a single server computer 342. As discussed above, each of the instances 320 may be configured to execute all or a portion of an application. Additionally, the network 306 may be similar to the network as described above. The networked environment 300 may span one or more data centers, where each data center may be geographically distinct from each other. Additionally, the networked environment 300 shown in FIG. 3 may be one of several embodiments employed by the computing resource service provider.

In one embodiment, the computing resource service provider 304 includes a load balancer database 310, an instance service 312, a placement service 326, an auto-scale service 330, a maintenance service 332, a metrics service 334, a load balancing service 336, and/or other components. The load balancer database 310 may include load balancer data 342. For example, as described above, the load balancer database 310 includes one or more records of load balancers 340 associated with the auto-scale group 302. Each one of the records of the load balancer data 346 corresponds to a load balancer 340 of the networked environment 300.

The instance service 312 instantiates instances 320 based at least in part on a set of preferences provided by the customer. In one embodiment, the instance service 312 receives, from the customer on the client device 306, a request 336 to create one or more instances 332 and optionally assign the created instances 320 to an auto-scale group 302. Additionally, the request 336 received from the customer on the client device 306 may also indicate a time to start execution of the requested instances 320. In response to receiving the request, the instance service 312 instantiates instances 320. In various embodiments, the auto-scale service 330 receives the request and transmits a command to the instance service 312 to instantiate the instances 320 such that the instances are associated with the auto-scale group, for example, by associating auto-scale group 302 metadata with the instances 320. In one embodiment, the instance service 312 may place instances in standby or detach instances from the auto-scale group in response to a request from the client device 306 and/or auto-scale service 330. For example, the auto-scale service 330 may transmit a request to the instance service 312 to remove the auto-scale group 302 metadata associated with the instances 320 being detached from the auto-scale group 302 according to the request 336. Furthermore, the auto-scale service 330 may deassign a detached instance from the load balancer 340.

The customer may interact with the computing resource service provider 304 (via appropriately configured and authenticated API calls) to provision, operate, and manage instances 320 associated with the auto-scale group 302 that is instantiated on server computers 342 and operated by the computing resource service provider 304. Additionally, the customer may create one or more auto-scale groups 302, and the auto-scale groups 302 may be a logical collection of instances 320. Furthermore, the instances 320 may be assigned to the auto-scale group 302 or may be members of the auto-scale group 302. The auto-scale service 330 may allow customers to interact with and manage various auto-scale groups 302. For example, the customer may, through the auto-scale service 330, set a maximum or minimum capacity for an auto-scale group 302. The auto-scale group 302 may then manage the instances 320 assigned to the auto-scale group in order to maintain the settings provided by the customer. In various embodiments, the customer may create and manage auto-scale groups 302 through a management console, as described above, provided by the computing resource service provider 304.

The management console may be exposed to the customers as a webpage; by interacting with the webpage (e.g., through a browser application) the customer may cause API calls to be generated. The generated API calls may cause the computing resource service provider 304 or component thereof to perform various operations indicated by the customer. Once the customer has created the auto-scale group 302, the customer may assign one or more load balancers to the auto-scale group 302 by submitting requests 336. The requests 336, in this case, may be processed by the auto-scale service 330 or other component of the computing resource service provider 304. The instances 320 of the auto-scale group 302 may be used for various purposes, such as to operate as servers supporting a website, to operate business applications, or generally, to serve as computing power for the customer. Other applications for the instances 320 may be to support database applications, electronic commerce applications, business applications and/or other applications. Additionally, load balancers 340 may distribute traffic to various instances 320 of the auto-scale group 302 to enable operation of the instances for the various purposes described above and prevent the instances 320 of the auto-scale group 302 from being overloaded. Although the instance service 312 is shown in FIG. 3, any other computer system or computer system service may be utilized by the computing resource service provider 302, such as a computer system or computer system service that does not employ virtualization or instantiation and instead provisions computing resources on dedicated or shared computers/servers and/or other physical devices.

The placement service 326 provisions the instances 320 to one or more of the server computers 342. In one embodiment, the placement service 326 determines the server computers 342 to provision the new instances 320 based at least in part on the indicated auto-scale group 302 of the new instances 320. For example, the placement service 326 may identify one or more server computers 342 with the appropriate capacity to execute the instances 320. To this end, the placement service 326 determines the capacity of each server computer 342 from the resource data 310 stored in the data store and accordingly provisions the instances 230, as will be described. The auto-scale service 330 automatically scales the capacity of a collection of previously requested instances 320 up or down based at least in part on circumstances defined by the customer that requested the instances 320. For example, the auto-scale service 330 may decrease the number of instances 320 allocated to the customer during demand lulls and increase the number of instances 320 allocated to the customer during demand peaks.

In one embodiment, the auto-scale service 330 sheds a subset of the requested instances 320 during a period of low usage and/or idle time. For example, the auto-scale service 330 may determine that the amount of instances 320 requested by the customer is redundant and/or excessive. In response, the auto-scale service 330 may terminate a certain number of instances 320 allocated to the customer such that the remaining number of instances 320 allocated to the customer is not redundant and/or excessive. In another embodiment, the auto-scale service 330 may shed the subset of the requested instances 330 if the usage rate does not exceed a predetermined threshold. Similarly, the auto-scale service 330 increases the amount of instances 320 during a period of high usage. In one embodiment, the auto-scale service 330 may increase the amount of instances 320 if the usage rate exceeds a predetermined threshold.

The request 326, received from the client device 306, may include API calls to update or modify load balancers 340 associated with the auto-scale group 302 as described above. The API calls included in the request may be received at an interface of the computing resource service provider 304. Additionally the API calls and/or requests may be authenticated by the computing resource service provider 304. The interface may direct the API calls to the appropriate service for processing the request. For example, an API call to add a load balancer to the auto-scale group 302 may be directed to the auto-scale service 330 capable of processing the request 326. The auto-scale service 330 may then, synchronously with receiving the request 326, store information corresponding to the load balancers 340 included in the request 326 to the load balancer database 310.

The background process, described in greater detail above in connection with FIG. 2, may periodically or aperiodically query the load balancer database 310 to determine if any load balancers 340 are in a transient state and create a workflow that executes in the background configured to update at least a portion of the instances 322 of the auto-scale group 302 by at least adding and/or removing the load balancers 340 to the instances 322. In various embodiments the auto-scale service 330 may be configured such that only one background process may be executed per auto-scale group 302. For example, if the customer, via the client device 306, attempts to update the load balancers associated with the auto-scale group while another update is processing, then the existing background process may be signaled that the background process should recalculate the operations required to update the load balancers 340 and restart the process.

The background process may generate dynamically-configurable batch sizes for both the load balancers 340 and instances 322 to perform operations on. For example, the background process may determine a full set of load balancers 340 associated with the auto-scale group 302, and the full set of instances 322 included in the auto-scale group 302. The background process may then perform the operations required to update the load balancers 340 in batches (e.g., adding and/or remove load balancers 340 to/from the instances 322 in the auto-scale group 302). The background process may prioritize the batch based on a variety of different factors. For example, the background process may perform all add operations prior to performing any remove operations. In another example, the background process may complete the operations for a single load balancer prior to performing an operation on any other load balancer indicated in the request 326. The background process may communicate with one or more other services in order to complete the update load balancer operation included in the request 326. For example, the background process may generate an API request configured to cause the load balancing service 336 to execute the operation included in a particular batch (e.g., adding and/or removing load balancers 340 to/from the instances 322 in the auto-scale group 302).

The maintenance service 332 schedules maintenance, software updates, and/or firmware updates for the server computers 342. In one embodiment, the maintenance service 332 schedules the maintenance and software updates at an appropriate time based at least in part on the available capacity of the server computers 342. For example, the maintenance service 332 may schedule the maintenance and software updates at a time when the respective server computer 342 has a projected availability. In one embodiment, the maintenance service 332 may patch and restart the server computers 342 when the maintenance service 332 determines that the server computer 342 is not hosting any instances 320. Additionally, the maintenance service 332 may patch virtual machines associated with the instance 342 if necessary prior to instantiating new images that are associated with the respective virtual machines. For example, the maintenance service 332 may schedule a patch of the machine image based at least in part on the health status of the instances 320. In one embodiment, no additional instances may be provisioned on the server computer 342 until the scheduled maintenance is completed.

The maintenance service 332 may also periodically or aperiodically check the health status of the instances 320, including instances assigned to the auto-scale group 302 and/or load balancers 340. The health check may include determining the load, utilization, and operation of various components of the instances 320 such as the central processing unit, memory, networking interface, operating system, application, and other components of the instances 320. In various embodiments, when the maintenance service 332 determines that an instance 320 is unhealthy, based at least in part on the health check, the maintenance service 332 or other component of the service provider 304, such as the auto-scale service 230, may initiate a workflow to remove the unhealthy instances from the auto-scale group 302. Additionally, if the maintenance service 332, determines that a previously unhealthy instance 320 has returned to a healthy status the maintenance service 332 or other component of the service provider 304, such as the auto-scale service 230, may move the instances 320 into service or attach the instances 320 to the auto-scale group 302. Furthermore, if an instance 322 assigned to a load balancer 340 returns a heathy status the auto-scale group 302 may update the status of the load balancer 340 to in-service, as described above. In various embodiments, the health check may be performed by a second background process distinct from the background process described above in connection with FIG. 2.

The metrics service 334 may be responsible for collecting resource data corresponding to the instances 320. The resource data obtained by the metrics service 334 may indicate the utilization of various components of the instances 320 such as the central processing unit, memory, networking interface, operating system, applications, and other components of the instances 320. This information may be used for a variety of different purposes, for example, determining whether to allocate or deallocate resources to the auto-scale group 302. Additionally, the information may be used by the maintenance service 332 to determine the health of an instance 320 and/or a server computer 342. The metrics service 334 may obtain and aggregate utilization information for all of the instances 320 assigned to the auto-scale group 302. Furthermore, when load balancers 340 are added or removed from the auto-scale group 320, the metrics service 334 may receive a command to add or remove the load balancers 340 from the set of load balancers 340 for which the metrics service 332 collects and/or aggregates utilization information.

A load balancer service 336 may be offered to customers of a computing resource service provider 304 in order to facilitate request processing by instances 320 of the customer. In various embodiments, the instances 320 may be assigned to the auto-scale group 302 and the load-balancer service 336 may distribute traffic to the instances 322 assigned to the auto-scale group 302. For example, the customer may operate a website using instances 320 assigned to the auto-scale group 302 using the resources of computing resource service provider 304. Additionally, the website may receive requests from multiple other customers over the network 206. The computing resource service provider 304 may configure a load balancer of the load balancer service 336 to direct the requests to the instances 320 of the auto-scale group 302 executing the website, in such a way that the load generated by processing the requests is distributed among the instances 320 of the auto-scale group 302 executing the website. The load balancer service 336 may be a computer system or virtual computer system configured to distribute the request to the instances 320 assigned to the load balancer in order to optimize resource utilization and/or avoid overloading a particular server computer 342. For example, the load balancer may include physical hardware connected to a server rack or otherwise included in a data center. In another example, the load balancer may include one or more virtual machines supported by the server computer 342.

Figure 4:
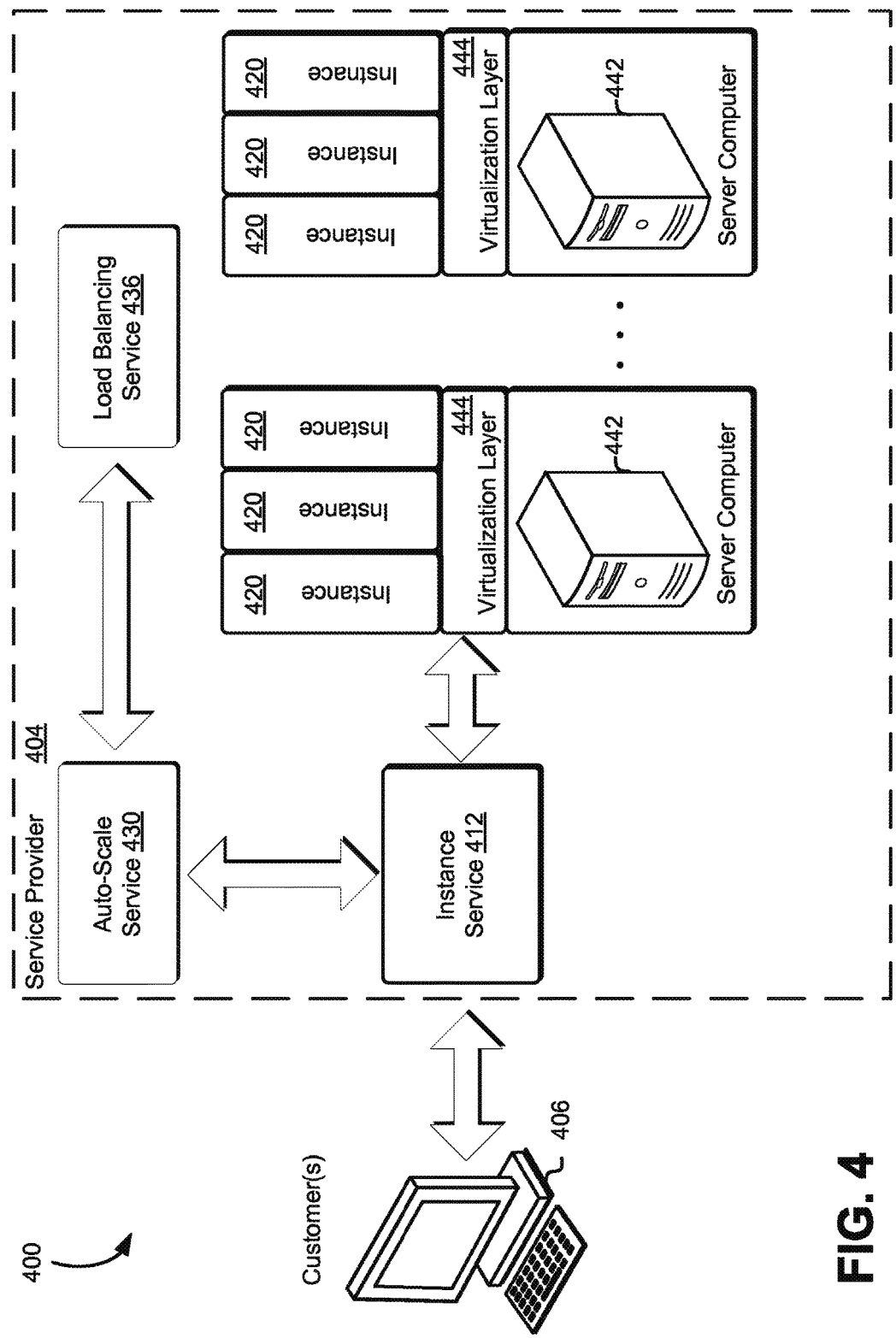
FIG. 4 illustrates an environment in which an instance service and auto-scaling service may manage load balancers for an auto-scaling group in accordance with an embodiment.

FIG. 4 illustrates an instance service 412 in accordance with at least one embodiment. The instance service 412, which may be implemented by physical hardware, is used by a service provider 404 to provide computation resources for customers 406. The physical hardware may include a server computer 442. The server computer 442 may be any device or equipment configured to execute instructions for performing data computation, manipulation, or storage tasks, such as a computer or a server. A server computer 442 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 444 may include a bare metal hypervisor or a hosted hypervisor. The virtualization layer 444 executing on the service computer 442 enables the physical hardware to be used to provide computational resources upon which one or more computer instances 420 may operate. For example, the virtualization layer may enable a virtual machine 420 to access physical hardware on the server computer 442 through virtual device drivers on the virtual machine 420. The virtualization layer 444 may include a hypervisor or virtualization software and/or hardware. The virtualization layer may also include an instance of an operating system dedicated to administering the computer instances 420 running on the server computer 442. Each virtualization layer 444 may include its own networking software stack, responsible for communication with other virtualization layers 444 and, at least in some embodiments, also responsible for implementing network connectivity between the computer instances 420 running on the server computer 442 and other computer instances 420 running on other server computers 442. Furthermore, the server computer 442 may host multiple virtualization layers 444 of the same or different types on the same server computer 442. The virtualization layer 444 may be any device, software, or firmware used for providing a virtual computing platform for the computer instances 420. The virtual computing platform may include various virtual computer components, such as one or more virtual CPUs, virtual memory, and the like. The computer instances 420 may be provided to the customers 406 of the service provider 404 and the customers 406 may run an operating system or an application on the computer instances 420. Further, the service provider 404 may use one or more of its own computer instances 420 for executing its applications. At least a portion of the computer instances 420 may execute kernel-level components for one or more other computer instances 420. For example, a particular computer instance may execute a parent partition configured to manage one or more child partitions executed by other computer instances, where the particular computer instance and the other computer instances are supported by the same virtualization layer 444.

Commands and other information may be included in an API call from the virtual machine management service 412 or the auto-scale service 430 to the virtualization layer 444. The virtual machine management service 412 may enable the customers 406 to manage and operate the computer instances 420. For example, the customer 406 may transmit a request to the virtual machine management service 412 to terminate all computer instances 420 operated by the customers 406. The request may be an API call including information corresponding to the customers 406 and computer instances 420. The virtual machine management service 412 may determine the corresponding virtualization layer 444 for the computer instances 420 included in the request and transmit a terminate command to the virtualization layer 444. The virtual machine management service 412 may be implemented in at least some embodiments, enabling a variety of client applications to run on virtual computer servers or computer instances 420 instantiated on behalf of the customers 406. The computer instances 420 may each comprise a virtual machine, with its own operating system comprising a networking software stack, and multiple such instances may be hosted on a given server computer 442 at a service provider network data center.

Figure 3:
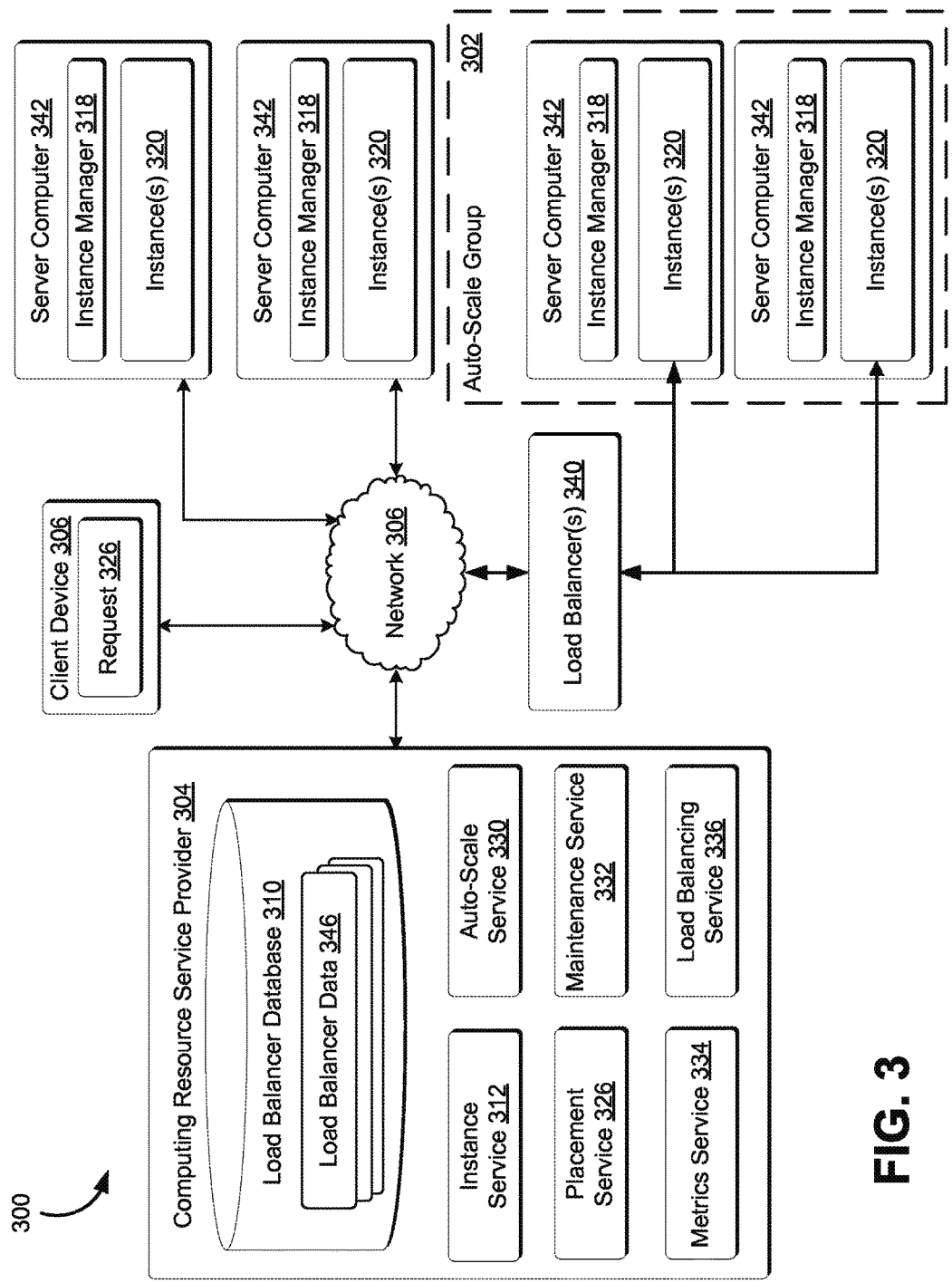
FIG. 3 illustrates an environment in which instances for an auto-scaling group may be associated with the a load balancer operated by a load balancing service in accordance with an embodiment.

Additionally a load balancing service 436, described in greater detail above in connection with FIG. 3, may transmit commands and other information included in an API call to the instance service 412. The instance service may determine the appropriate virtualization layer and cause the instance 420 to operate in accordance with the API call. For example, the load balancer service 436 may transmit an API call to a particular instance 420 implementing a load balancer, and the API call may be configured to cause the load balancer to manage and direct traffic to a set of instances of an auto-scale group as described above. In various embodiments, the load balancing service 436 and auto-scale service may transmit commands directly to the virtualization layer 444.

Figure 5:
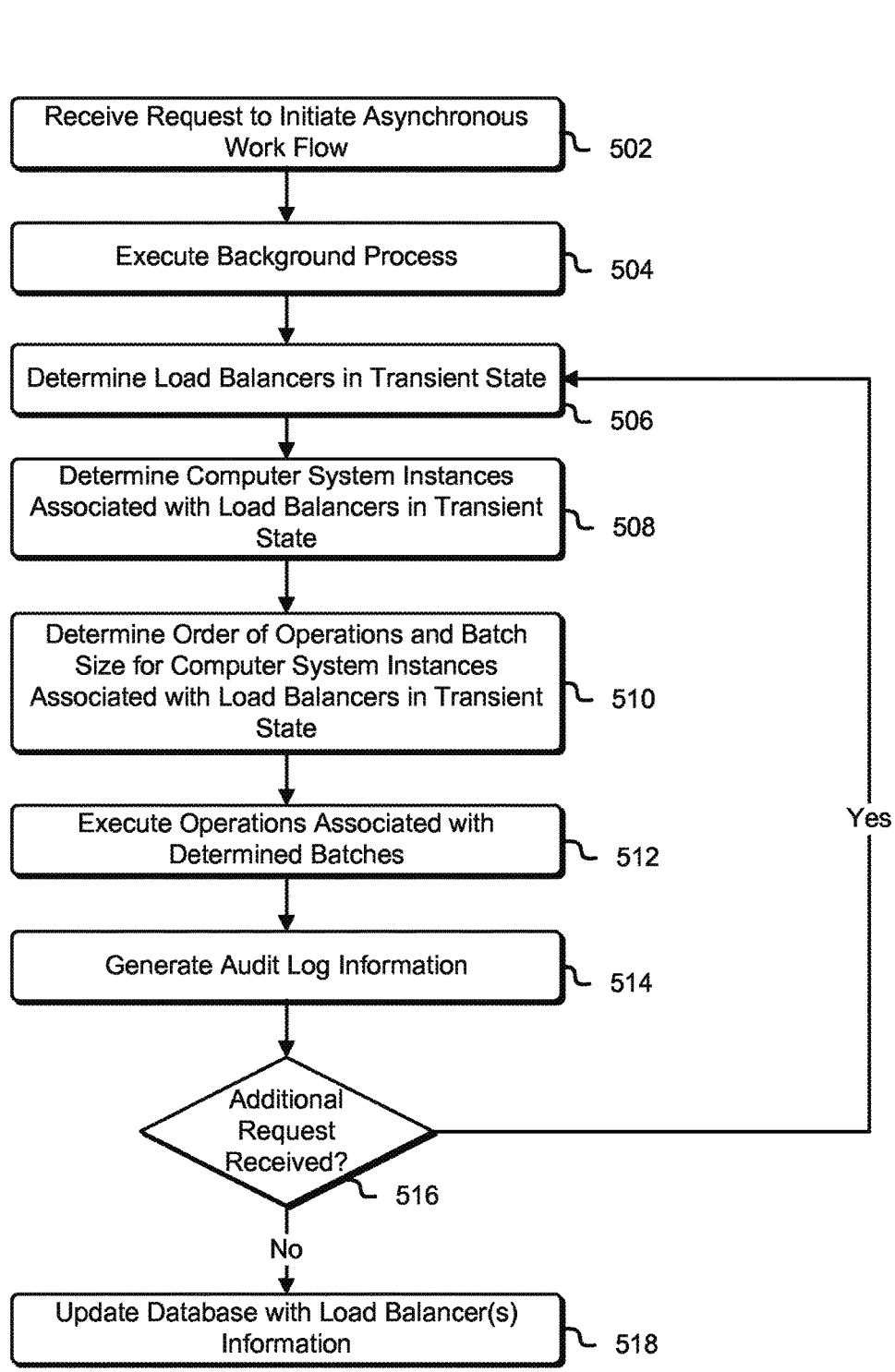
FIG. 5 is an illustrative process for assigning instances of an auto-scaling group to a load balancer using a background process in accordance with an embodiment.

FIG. 5 shows an illustrative process 500 which may be used to assign instances of an auto-scale group to a load balancer using a background process in accordance with an embodiment. The process 500 may be performed by any suitable system such as the auto-scale service described above in connection with FIGS. 2 and 3 or any combination of systems or components thereof such as the background process described above. Returning to FIG. 5, in an embodiment, the process 500 includes receiving a request to initiate an asynchronous work flow 502. An asynchronous work flow may be a set of operations or tasks to be performed by computer systems of the service provider, such as the auto-scale service, where the sequence or order of operations does not require the previous operation to be completed before starting the next operation. For example, as described above, the auto-scale service may receive a request to add a load balancer to an auto-scale group which requires an asynchronous work flow in order to process the request. The auto-scale service may then execute the background process 504. In numerous variations to the process 500, if the background process in currently executing the auto-scale service may cause the background process to be restarted or may cause the background process to restart at a particular point in the process 500.

The background process may then determine a set of load balancers in a transient state 506. For example, the background process may query the load balancer database for load balancers in the adding state, added state, or removing state as described above. The background process may then determine a set of computer system instances associated with the load balancers in the transient state. This may include all instances of the auto-scale group or only instances that have yet to be assigned or deassigned to a particular load balancer of the set of load balancers in a transient state. The background process may then determine an order of operations and batch size for the instances and load balancers in the transient state to be updated.

The determination may be made based on a variety of factors including a number of instances, a number of load balancers, an amount of load on a load balancing service, or other factors suitable for determine a batch size for updating instances and load balancers. Furthermore, the background process may query the load balancing service to determine an appropriate batch size, based at least in part on the load on the load balancing service and/or a number or type of operations to be performed on the load balancers (e.g., where instances are to be assigned or deassigned to the load balancer). In various embodiments, if the background process receives an error from the load balancing service, for example, if the load balancing service is unable to process the request, the background process may reduce the batch size and/or delay transmitting the API call associated with the batch for an interval of time.

The background process may then execute the operations associated with the determined batches 512. For example, the background process may transmit an API call to the load balancing service configured to assign 10 instances of the auto-scale group to a particular load balancer indicated in the API call. The auto-scale service and/or background process may then generate audit log information 514. The audit log information, as described above, may enable the customer to obtain information corresponding to the load balancers associated with the auto-scale group and the operation performed in adding and/or removing the load balancers (e.g., a result of executing the determined batch operations). The auto-scale service may generate at least a portion of the audit log information after enqueuing the asynchronous work flow and may generate additional audit log information after the asynchronous work flow is completed. For example, the auto-scale service generated audit log information, including an operation performed in accordance with the request and a start time. After completion of the asynchronous work flow, the auto-scale service may generate audit log information including a time the operation was completed and whether the operation was successful.

If additional requests are received 516 the background process may restart the process and determine load balancers in a transient state. If no additional requests are received 516, the background process may continue executing operations associated with the determined batches until all operations are completed. Once all operations are completed the background process may update the load balancer database with information associated with the load balancer in the transient state 518. For example, as described above, once all instances have been added to a particular load balancer, the background process may update the state information contained in the load balancer database to be added.

Figure 6:
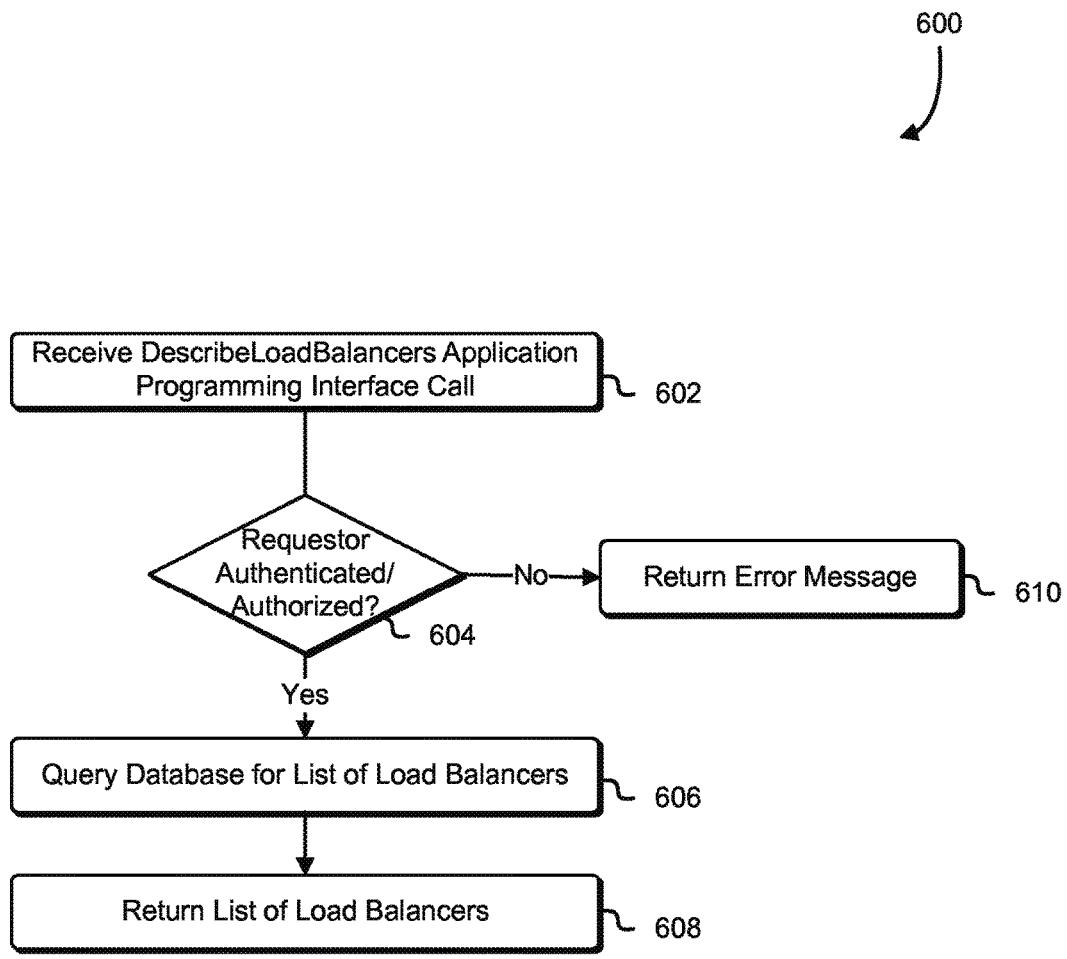
FIG. 6 is an illustrative process for returning load balancer information to a customer of the computing resource service provider based at least in part on an application program interface call in accordance with an embodiment.

FIG. 6 is a block diagram illustrating an example of a process 600 for enabling a customer to obtain information corresponding to one or more load balancers associated with the customer's auto-scale group in accordance with various embodiments. The process 600 may be performed by any suitable system such as a server in a data center, multiple computing devices in a distributed system of a computing resource service provider, or any service operated by the computing resource service provider such as the auto-scale service described above in connection with FIGS. 2 and 3. The process 600 includes a series of operations wherein a DescribeLoadBalancers application programming interface call is received from a requestor, the requestor is authenticated, then, if authenticated, the load balancer database is queried for the requested information and provided to the requestor. In some embodiments, the information obtained from the load balancer database may be formatted or otherwise modified for the requestor.

In 602, a computing resource service provider receives an application programming interface call from a customer or other entity to describe the load balancers associated with an auto-scale group. As described above, the auto-scale group or other component of the computing resource service provider may maintain a load balancer database. The load balancer database may contain information corresponding to load balancers associated with an auto-scale group, for example, identification information of the load balancers, a particular auto-scale group the load balancers are associated with, a state of the load balancers, a start time or end time the load balancer was assigned a particular state, and any other information suitable for describing the load balancers to a customer. Furthermore, the request may indicate a subset of the set of load balancers associated with the auto-scale group for which the customer request information corresponds. For example, the customer may indicate a particular load balancer to obtain information for or the customer may indicate one or more attributes of the load balancers to obtain information for, such as all load balancers added or removed from the auto-scale group in the last 24 hour interval.

In 604, the computing resource service provider determines whether the requestor has sufficient privileges to have the request fulfilled. For example, the requestor may have provided an identity and proof of possession of credentials as parameters with the DescribeLoadBalancers application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials was insufficient to prove the identity (e.g., wrong password), or the identity of the requestor could not otherwise be confirmed, the system performing the process 600 may not proceed further in the process 600. The system performing the process 600 may respond to a failure in authentication with an error message to the requestor and/or register the authentication failure in a security log 610. Otherwise, if the requestor is authenticated and determined to have sufficient privileges to have the DescribeLoadBalancers request fulfilled, the system performing the process 600 may proceed to 606.

Once the computing resource service provider determines the requestor has sufficient privileges to have the request fulfilled, the computing resource service provider or component thereof, such as the auto-scale service, may query the load balancer database for the requested information 606. The load balancer database may be maintained in a data storage service or database service of the computing resource service provider. In response to the query, the auto-scale service may obtain the information indicated in the request. For example, the auto-scale service may obtain a list of load balancers associated with the auto-scale group and a status of the load balancers included in the list. The auto-scale service may then provide the list of load balancers to the requester in response to the request 608.

Figure 7:
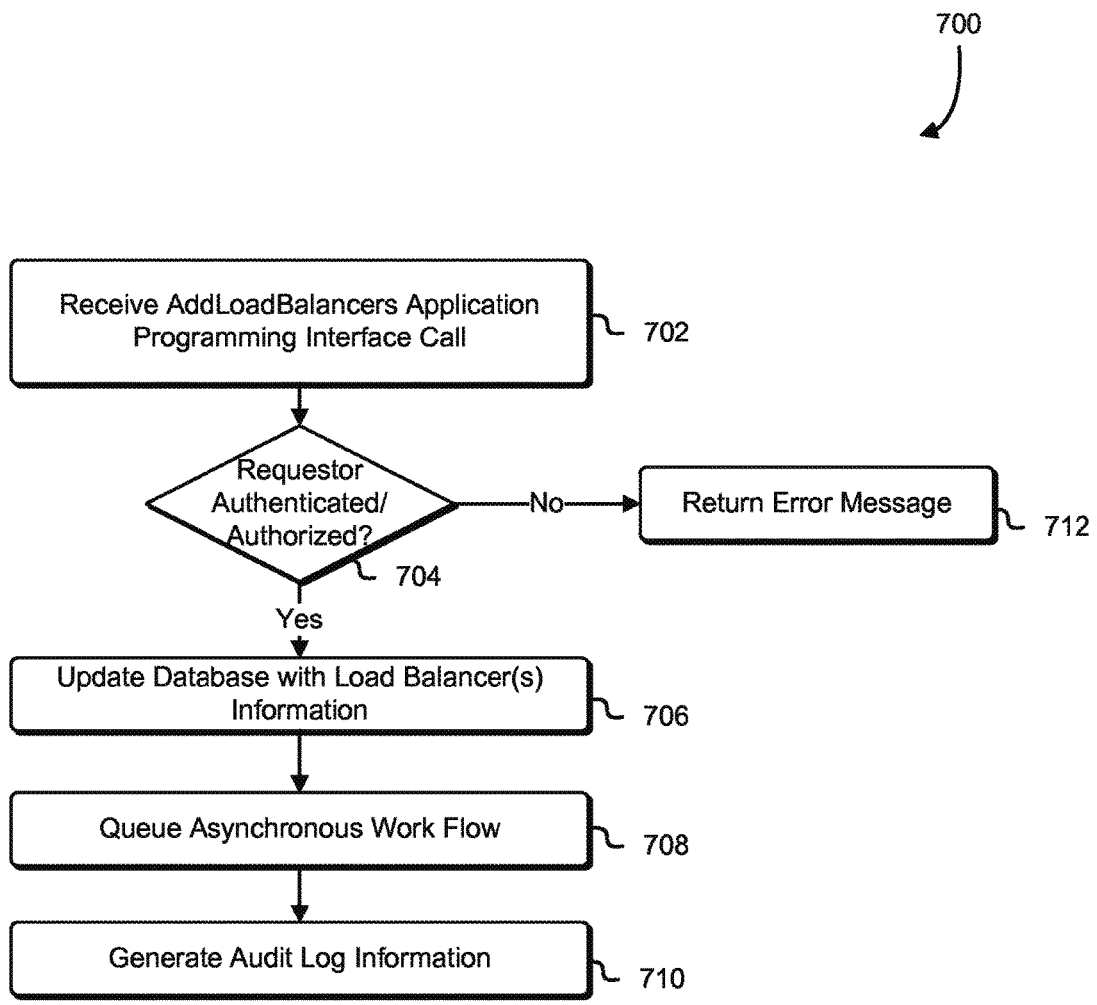
FIG. 7 is an illustrative process for adding a load balancer to an auto-scaling group based at least in part on an application program interface call in accordance with an embodiment.

FIG. 7 is a block diagram illustrating an example of a process 700 for adding a load balancer to an auto-scale group in accordance with various embodiments. The process 700 may be performed by any suitable system such as a server in a data center, multiple computing devices in a distributed system of a computing resource service provider, or any service of the computing resource service provider such as the auto-scale service described above in connection with FIGS. 2 and 3. The process 700 includes a series of operations wherein a AddLoadBalancer application programming interface call is received from a requestor, the requestor is authenticated, then, if authenticated, a load balancer database is updated with load balancer information and the load balancer in added to the auto-scale group.

In 702, a computing resource service provider receives an application programming interface call from a customer or other entity to add one or more load balancers to the auto-scale group. Adding the one or more load balancers to the auto-scale group may cause the one or more load balancers to manage and direct network traffic to a set of instances included in the auto-scale group. Furthermore, adding the one or more load balancers to the auto-scale group may include operations performed by various other services of the computing resource service provider. For example, a customer may cause the load balancers to be created by submitting a request to a load balancing service described in greater detail above. Additionally, the auto-scale service or component thereof, such as a background process, may add the one or more load balancers to the auto-scale group by submitting batches of API calls to the load balancing service. For example, the background process may determine a batch of 10 instances to assign to a particular load balancer, generate an API call configured to cause the load balancing service to assign the 10 instances to the particular load balancer, and provide the API call to the load balancing service.

In 704, the computing resource service provider determines whether the requestor has sufficient privileges to have the request fulfilled. For example, the requestor may have provided an identity and proof of possession of credentials as parameters with the AddLoadBalancer application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials was insufficient to prove the identity (e.g., wrong password), or identity of the requestor could otherwise not be confirmed, the system performing the process 700 may not proceed further in the process 700. The system performing the process 700 may respond to a failure in authentication with an error message to the requestor and/or register the authentication failure in a security log 712. Otherwise, if the requestor is authenticated and determined to have sufficient privileges to have the AddLoadBalancer request fulfilled, the system performing the process 700 may proceed to 706.

In 706, the system performing the process 700 may update the load balancer database with information corresponding to the load balancers indicated in the request. For example, the request may include an identifier of the load balancer to be added, a customer associated with the load balancer, a computing resource service provider or service thereof associated with the load balancer, or other information suitable for enabling the auto-scale service to add the load balancer to the auto-scale group. For example, updating the load balancer database may include generating a row in the database containing the identifier of the load balancer and a status of the load balancer. The status may be determined by the auto-scale service. For example, if the load balancer has not been previously added to the auto-scale group, the auto-scale service may assign a status of adding to the row corresponding to the load balancer in the load balancer database.

The auto-scale service or other system performing the process 700 may then queue an asynchronous work flow 708. The asynchronous work flow may be a process, such as process 500 described above in connection with FIG. 5, configured to assign instances of the auto-scale group to the load balancer indicated in the request. The asynchronous work flow may be completed by the background process described above. The auto-scale service may then generate audit log information 710. The audit log information, as described above, may enable the customer to obtain information corresponding to the load balancers associated with the auto-scale group and the operation performed in adding and/or removing the load balancers. The auto-scale service may generate at least a portion of the audit log information after enqueuing the asynchronous work flow and may generate additional audit log information after the asynchronous work flow is completed. For example, the auto-scale service generated audit log information, including an operation performed in accordance with the request and a start time, after completion of the asynchronous work flow, the auto-scale service may generate audit log information including a time the operation was completed and whether the operation was successful.

Figure 8:
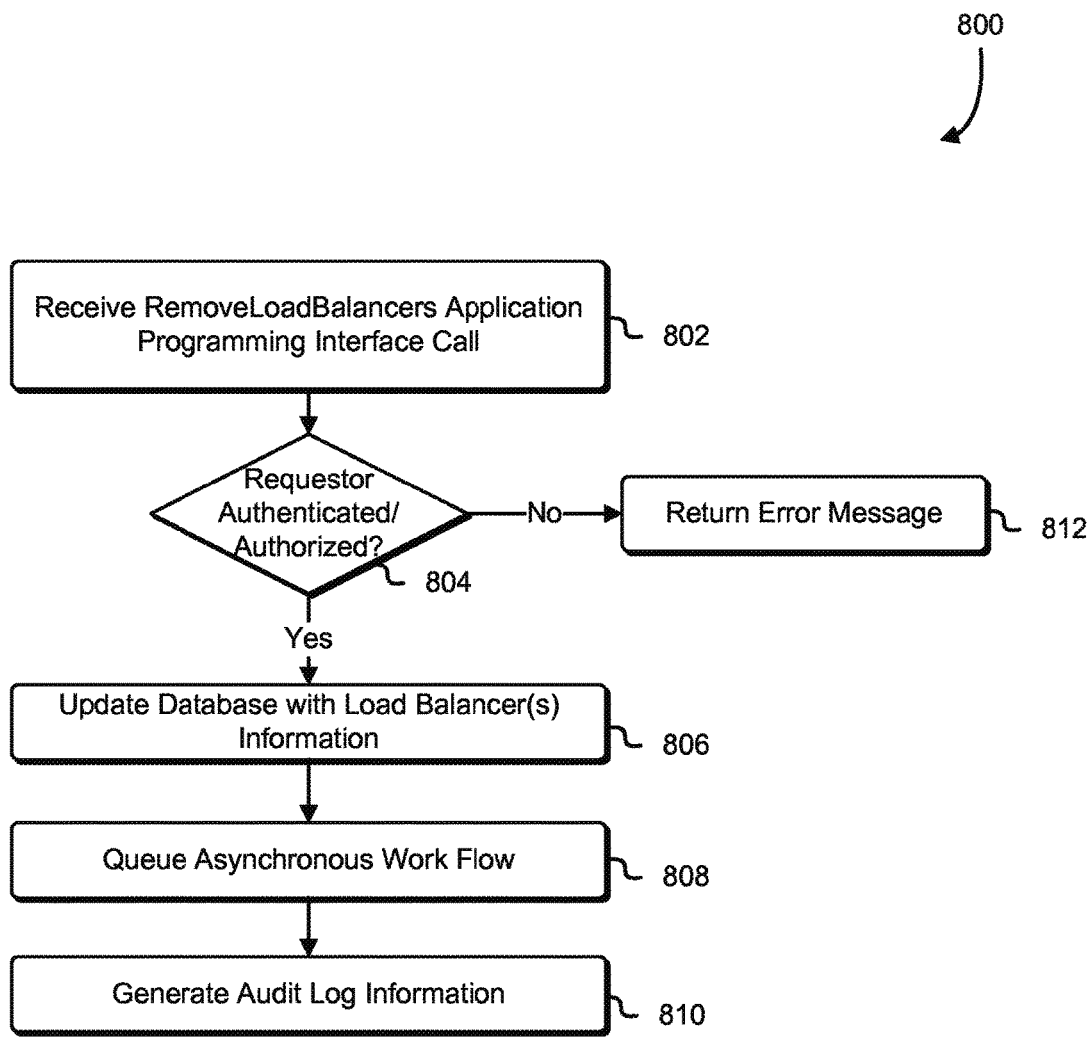
FIG. 8 is an illustrative process for removing a load balancer to an auto-scaling group based at least in part on an application program interface call in accordance with an embodiment.

FIG. 8 is a block diagram illustrating an example of a process 800 for removing a load balancer to an auto-scale group in accordance with various embodiments. The process 800 may be performed by any suitable system such as a server in a data center, multiple computing devices in a distributed system of a computing resource service provider, or any service of the computing resource service provider such as the auto-scale service described above in connection with FIGS. 2 and 3. The process 800 includes a series of operations wherein a RemoveLoadBalancer application programming interface call is received from a requestor, the requestor is authenticated, and then, if authenticated, a load balancer database is updated with load balancer information, and the load balancer in removed to the auto-scale group.

In 802, a computing resource service provider receives an application programming interface call from a customer or other entity to remove one or more load balancers to the auto-scale group. Removing the one or more load balancers to the auto-scale group may cause the one or more load balancers to manage and direct network traffic to a set of instances included in the auto-scale group. Furthermore, removing the one or more load balancers to the auto-scale group may include operations performed by various other services of the computing resource service provider. For example, a customer may cause the load balancers to be created by submitting a request to a load balancing service described in greater detail above. Additionally, the auto-scale service or component thereof such as a background process, may remove the one or more load balancers to the auto-scale group by submitting batches of API calls to the load balancing service. For example, the background process may determine a batch of 10 instances to assign to a particular load balancer, generate an API call configured to cause the load balancing service to assign the 10 instances to the particular load balancer, and provide the API call to the load balancing service.

In 804, the computing resource service provider determines whether the requestor has sufficient privileges to have the request fulfilled. For example, the requestor may have provided an identity and proof of possession of credentials as parameters with the RemoveLoadBalancer application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials was insufficient to prove the identity (e.g., wrong password), or identity of the requestor could otherwise not be confirmed, the system performing the process 800 may not proceed further in the process 800. The system performing the process 800 may respond to a failure in authentication with an error message to the requestor and/or register the authentication failure in a security log 812. Otherwise, if the requestor is authenticated and determined to have sufficient privileges to have the RemoveLoadBalancer request fulfilled, the system performing the process 800 may proceed to 806.

In 806, the system performing the process 800 may update the load balancer database with information corresponding to the load balancers indicated in the request. For example, the request may include an identifier of the load balancer to be removed, a customer associated with the load balancer, a computing resource service provider or service thereof associated with the load balancer, or other information suitable for enabling the auto-scale service to remove the load balancer to the auto-scale group. For example, updating the load balancer database may include generating a row in the database containing the identifier of the load balancer and a status of the load balancer. The status may be determined by the auto-scale service. For example, if the load balancer has not been previously removed to the auto-scale group, the auto-scale service may assign a status of removing to the row corresponding to the load balancer in the load balancer database.

The auto-scale service or other system performing the process 800 may then queue an asynchronous work flow 808. The asynchronous work flow may be a process, such as the process 500 described above in connection with FIG. 5, configured to assign an instance of the auto-scale group to the load balancer indicated in the request. The asynchronous work flow may be completed by the background process described above. The auto-scale service may then generate audit log information 810. The audit log information, as described above, may enable the customer to obtain information corresponding to the load balancers associated with the auto-scale group and operation performed in adding and/or removing the load balancers. The auto-scale service may generate at least a portion of the audit log information after enqueuing the asynchronous work flow and may generate additional audit log information after the asynchronous work flow is completed. For example, the auto-scale service generated audit log information, including an operation performed in accordance with the request and a start time, after completion of the asynchronous the auto-scale service may generate audit log information, including a time the operation was completed and whether the operation was successful.

Figure 9:
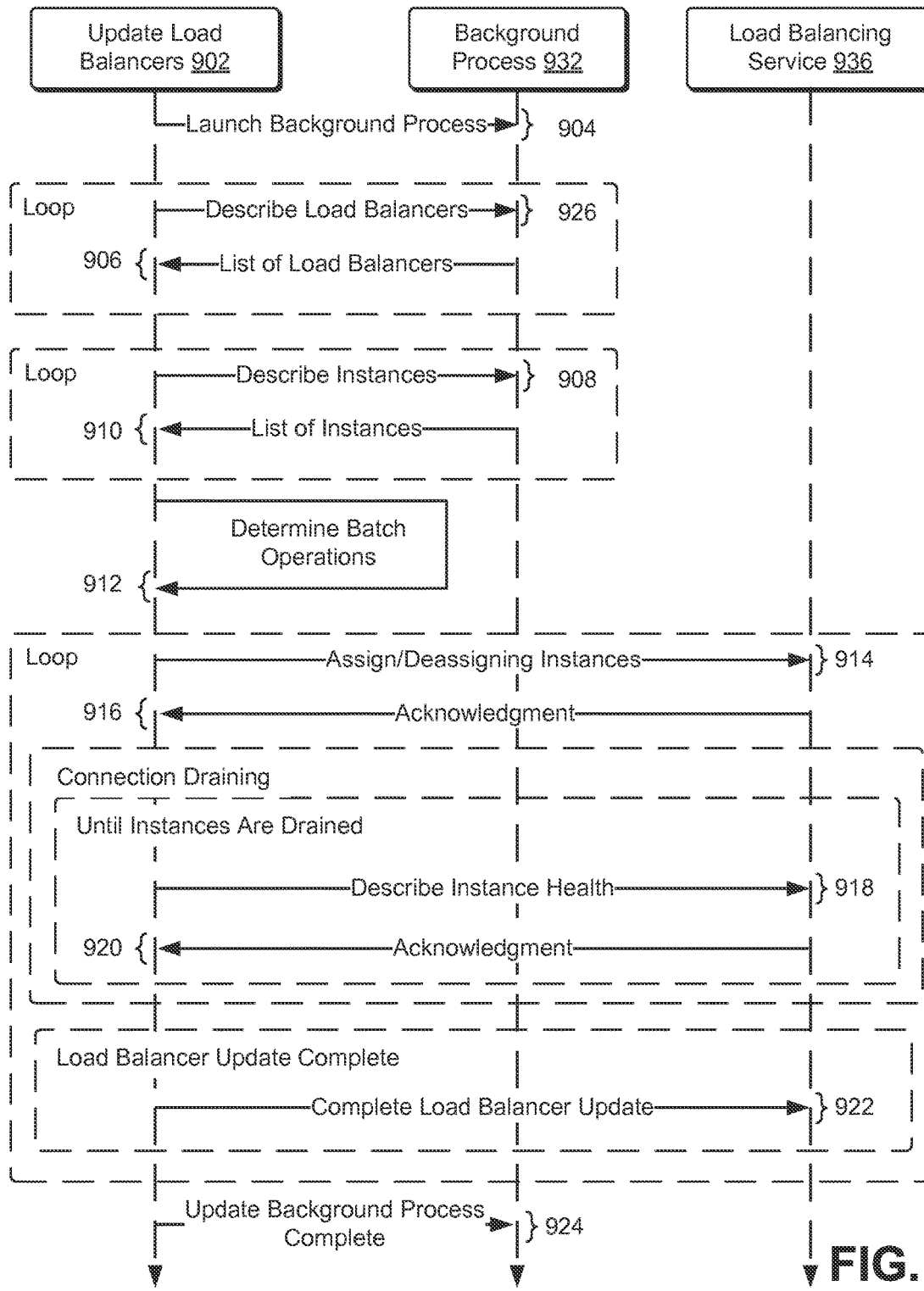
FIG. 9 is an illustrative messaging diagram for updating instances and load balancers of an auto-scaling group using a background process in accordance with an embodiment.

FIG. 9 shows a messaging diagram illustrating an update to load balancers 902 of an auto-scale group using a background process 932 in accordance with an embodiment. The update to the load balancers 902 may be in response to an API call from a customer to update (e.g., add or remove) load balancers associated with an auto-scale group, such as the API calls described above in connections with FIGS. 7 and 8. The auto-scale service may perform the update using the background process 932 and may communicate with a load balancing service 936 to update an association with the instances of the auto-scale group to one or more load balancers managed by the load balancing service. The background process may execute an asynchronous workflow as described above in connection with FIG. 5. For example, as described above, the auto-scale service may receive a request to add a load balancer to an auto-scale group which requires an asynchronous work flow in order to process the request. The auto-scale service may then execute the background process 932, by launching the background process 904. In various embodiments, if the background process is currently executing, the auto-scale service may cause the background process to be restarted or may cause the background process to restart at an operation or step in the update load balancers 902 API call.

The background process may then determine a set of load balancers in a transient state in response to a request from auto-scale service to describe load balancers 926. As a result, the background process may query the load balancer database for load balancers in the adding state, added state, or removing state as described above. In various embodiments, the auto-scale service may request information corresponding to all the load balancers associated with the group regardless of the state of the load balancer. The background process may then return a list of load balancers associated with the auto-scale group and additional information corresponding to the load balancers such as state information or status information. Although a list is described, any data structure ordered or unordered may be used to return load balancer information to the auto-scale service. This process may execute in a loop, as indicated in FIG. 9, until the auto-scale service receives a token indicating to continue onto the next step in the update load balancers 902 operation. The loop may be an optional parameter included in the API call received from the customer.

The background process may then determine a set of computer system instances associated with the load balancers in the transient state in response to a request from auto-scale service to describe instances 908. This may include all instances of the auto-scale group or only instances that have yet to be assigned or deassigned to a particular load balancer of the set of load balancers in a transient state. The background process 932 may then determine a list of instances of the auto-scale group and provide the auto-scale service with the list of instances 910. The background process may query the load balancer database or other database containing information corresponding to instances of the auto-scale group. Although a list is described, any data structure ordered or unordered may be used to return load balancer information to the auto-scale service. This process may execute in a loop, as indicated in FIG. 9, until the auto-scale service receives a token indicating to continue onto the next step in the update load balancers 902 operation. For example, describe load balancers and describe instances may execute in a loop until the background process 932 determines that all of the information corresponding to the load balancers and instances has been obtained. The loop may be an optional parameter included in the API call received from the customer.

The auto-scale service may then determine an order of operations and batch size for the instances and load balancers in the transient state to be updated 912. The determination may be made based on a variety of factors including a number of instances, a number of load balancers, an amount of load on a load balancing service, or other factors suitable to determine a batch size for updating instances and load balancers. Furthermore, the background process may query the load balancing service to determine an appropriate batch size, based at least in part on the load on the load balancing service and/or a number or type of operations to be performed on the load balancers (e.g., where instances are to be assigned or deassigned to the load balancer). In various embodiments, if the background process receives an error from the load balancing service, for example, if the load balancing service is unable to process the request, the background process may reduce the batch size and/or delay transmitting the API call associated with the batch for an interval of time.

The auto-scale service may then execute the operations associated with the determined batches. For example, the background process may transmit an API call to the load balancing service configured to assign instances of the auto-scale group to a particular load balancer indicated in the API call 914. The load balancing service 936 may send an acknowledgment 916. The acknowledgement may include information corresponding to the instances in the batch that were successfully assigned to the load balancers as well as instances that were not successfully assigned to the load balancers. The acknowledgement may enable the auto-scale service to determine instances that are already assigned to the load balancers. For example, the acknowledgement may indicate that a particular instance was not successfully assigned to the load balancer, this may indicate that the instance was previously assigned to the load balancer.

If the update includes load balancers to be removed from the auto-scale group, the auto-scale service may wait for the instances being deassigned from the load balancer to complete connection draining operations as described above.

While the instances are in the process of draining all current connections the auto-scale service may periodically or aperiodically determine the instance health 918. The load balancing service 936 may return an acknowledgment 920 indicating the remaining connections to the instances. Once all the instance have been assigned or deassigned, the auto-scale service may complete the load balancer update by transmitting a complete load balancer update to the load balancing service 936. This may indicate to the load balancing service 936 that all batch operations have been completed. The auto scale service may then update the background process that the update load balancers is complete 924. In various embodiments, the update background process complete causes the background process to terminate operation.

The auto-scale service and/or background process may then generate audit log information. The audit log information, as described above, may enable the customer to obtain information corresponding to the load balancers associated with the auto-scale group and the operation performed in adding and/or removing the load balancers (e.g., a result of executing the determined batch operations). The auto-scale service may generate at least a portion of the audit log information after enqueuing the asynchronous work flow and may generate additional audit log information after the asynchronous work flow is completed. For example, the auto-scale service generated audit log information, including an operation performed in accordance with the request and a start time, after completion of the asynchronous work flow, the auto-scale service may generate audit log information including a time the operation was completed and whether the operation was successful.

If additional requests are received, the background process may restart the process and determine load balancers in a transient state. If no additional requests are received, the background process may continue executing operations associated with the determined batches until all operations are completed. Once all operations are completed the background process may update the load balancer database with information associated with the load balancer in the transient state. For example, as described above, once all instances have been added to a particular load balancer, the background process may update the state information contained in the load balancer database to be added.

Figure 10:
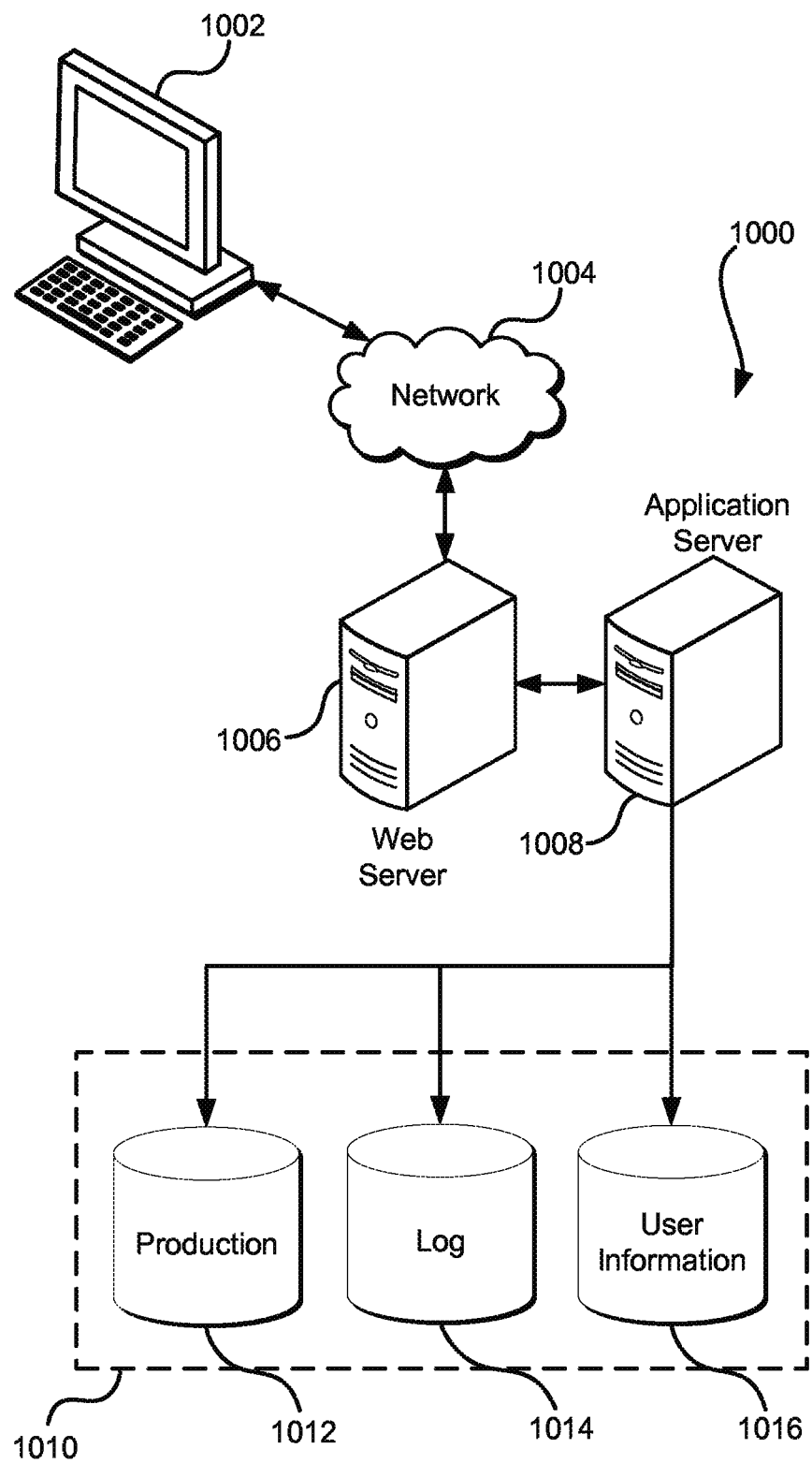
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting one or more load balancers of a set of load balancers in a transient state, where the transient state indicates that one or more load balancers associated with an auto-scale group requires an update, and where the auto-scale group comprises a set of computer instances and membership of the set of computer instances is modified in accordance with a scaling setting;
    receiving, from an auto-scale service, a request to initiate an asynchronous workflow to update computer instances of the auto-scale group, managed by the auto-scale service, by at least associating the computer instances with at least one load balancer of a set of load balancers assigned to the auto-scale group;
    determining one or more computer instances of a set of computer instances of the auto-scale group to be updated based at least in part on the one or more load balancers in the transient state;
    determining a set of batch operations to update an association between the one or more computer instances and the one or more load balancers in the transient state;
    causing the set of batch operations to be executed; and
    causing the update to be performed on a load balancer database as a result of the set of batch operations being executed, the update indicating a modification to a number of load balancers of the one or more load balancers associated with an auto-scale group.

2. The computer-implemented method of claim 1, wherein determining the set of batch operations to update the association between the one or more computer instances and the one or more load balancers in the transient state further comprises a set of application program interface calls as a result of being fulfilled cause the one or more computer instances to be assigned the one or more load balancers such that the one or more load balancers distribute network traffic to the one or more computer instances.

3. The computer-implemented method of claim 1, wherein determining the set of batch operations to update the association between the one or more computer instances and the one or more load balancers in the transient state further comprises a set of application program interface calls as a result of being fulfilled cause the one or more computer instances to be removed from the one or more load balancers such that the one or more load balancers no longer distribute network traffic to the one or more computer instances.

4. The computer-implemented method of claim 1, wherein the computer-implemented method further comprises receiving a second request to initiate an update to computer instances of an auto-scale group and restarting the asynchronous workflow.

5. A system, comprising:
    one or more processors; and
    memory that includes instructions that, if executed by the one or more processors, cause the system to:
        receive a request to initiate a workflow;
        fulfill the request by at least:
            determining at least one load balancer of a set of load balancers in a transient state;
            determining at least one computer instance of a group of computer instances, associated with one another to conform to a scaling parameter, to be assigned to the at least one load balancer in the transient state; and
            determining operations to assign the at least one computer instance to the at least one load balancer in the transient state;
        cause the operations to be executed; and
        cause an update to be performed to a data store, the update indicating a modification to the set of load balancers associated with the group of computer instances.

6. The system of claim 5, wherein the instructions that cause the system to determine the at least one load balancer of the set of load balancers in the transient state further include instructions that, if executed by the one or more processors cause the system to:
    query the data store for load balancer state information; and
    determine the at least one load balancer is in the transient state based at least in part on a result of the query.

7. The system of claim 6, wherein the memory further includes instructions that, if executed by the one or more processors cause the system to update load balancer state information in the data store based at least in part on a result of the operations.

8. The system of claim 5, wherein the memory further includes instructions that, if executed by the one or more processors cause the system to:
    receive a second request to initiate a second workflow;
    fulfill the second request by at least:
        determining a second at least one load balancer of the set of load balancers, where the second at least one load balancer is in a removing state; and
        determining a second at least one instance of the group of computer instances to be removed from the at least one load balancer; and
    cause additional operations to be executed, where the additional operations as a result of being executed remove the second at least one computer instance from the second at least one load balancer in the transient state.

9. The system of claim 8, wherein the memory further includes instructions that, if executed by the one or more processors, cause the system to determine that the request and the second request would occur concurrently and restart a background process to execute the second workflow.

10. The system of claim 5, wherein the instructions that cause the system to cause the operations to be executed further include instructions that, if executed by the one or more processors, cause the system to provide the operations to a load balancing service.

11. The system of claim 10, wherein causing the operations to be executed further comprises application program interface calls to assign the at least one computer instance to the at least one load balancer.

12. The system of claim 5, wherein the request to initiate the workflow is generated based at least in part on an application program interface (API) call from a customer to add a particular load balancer to the group of computer instances.

13. A non-transitory computer-readable storage medium having stored thereon executable instructions that, if executed by one or more processors of a computer system, cause the computer system to at least:
    determine a set of load balancers to update based at least in part on a portion of the load balancers of the set of load balancers being in a transient state by at least querying a data store for information corresponding to load balancers associated with a group of computer instances, where membership of the group of computer instances is enforced based at least in part on a setting of the group of computer instances;

determine a set of computer instances associated with the group of computer instances, where an association between the set of computer instances and the set of load balancers is to be updated;

determine a set of operations to update an association between the set of computer instances and the set of load balancers;

cause the set of operations to be executed; and update the data store to indicate a modification to a number of load balancers of the set of load balancers as a result of the set of operations being executed.

14. The non-transitory computer-readable storage medium of claim 13, wherein the transient state indicates that at least one computer instance of the group of computer instances requires an update to at least one load balancer of the portion of load balancers in the transient state.

15. The non-transitory computer-readable storage medium of claim 13, wherein the transient state includes at least one of the following states: adding state, added state, and removing state.

16. The non-transitory computer-readable storage medium of claim 13, wherein the instructions that cause the computer system to generate the operations to update the association between the set of computer instances and the set of load balancers further include instructions that cause the computer system to generate the operations such that, if executed, the operations cause the set of computer instances to be deassigned from the set of load balancers.

17. The non-transitory computer-readable storage medium of claim 13, wherein the instructions that cause the computer system to generate the operations to update the association between the set of computer instances and the set of load balancers further include instructions that cause the computer system to generate the operations such that, if executed, the operations cause the set of computer instances to be assigned from the set of load balancers.

18. The non-transitory computer-readable storage medium of claim 13, wherein the instructions further comprise instructions that, if executed by the one or more processors, cause the computer system to:

receive a request to terminate a background process based at least in part on a request to update load balancers associated with the group of computer instances, where the background process causes the computer system to generate the operations; and reinitiate the background process in order to process the request.

19. The non-transitory computer-readable storage medium of claim 13, wherein the instructions further comprise instructions that, if executed by the one or more processors, cause the computer system to determine a number of computer instances of the group of computer instances to be updated to include in a particular operation of the operations based at least in part on a computing capacity of a load balancing service.

20. The non-transitory computer-readable storage medium of claim 13, wherein the instructions further comprise instructions that, if executed by the one or more processors, cause the computer system to determine an order of operations based at least in part on information obtained from a load balancing service.

* * * * *